United States Patent (10) Patent No.: US 8,082,006 B2
Hasegawa et al. (45) Date of Patent: Dec. 20, 2011

(54) BASE STATION, RECEIVING APPARATUS, AND RECEIVER TROUBLE DIAGNOSING METHOD (75) Inventors: Yoshiaki Hasegawa, Yokohama (JP); Akihiro Saito, Yokohama (JP); Tomoya Uchiike, Yokohama (JP); Yoshihiro Kanomata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 610 days.

(21) Appl. No.: 11/914,264

(22) PCT Filed: Dec. 19, 2005

(86) PCT No.: PCT/JP2005/023286
§ 371 (c)(1),
(2), (4) Date: Feb. 19, 2009

(87) PCT Pub. No.: WO2006/120777
PCT Pub. Date: Nov. 16, 2006

(65) Prior Publication Data
US 2009/0170560 A1 Jul. 2, 2009

(30) Foreign Application Priority Data
May 12, 2005 (JP) .................................. 2005-139711

(51) Int. Cl.
*H04M 1/00* (2006.01)
*H04B 1/38* (2006.01)

(52) U.S. Cl. ....................................................... 455/561
(58) Field of Classification Search ................... 455/561
See application file for complete search history.

(56) References Cited

FOREIGN PATENT DOCUMENTS

| JP | 11-017629 | 1/1999 |
|---|---|---|
| JP | 2001-127715 | 5/2001 |
| JP | 2002-246978 | 8/2002 |
| JP | 2003-037551 | 2/2003 |

*Primary Examiner* — Duc Nguyen
*Assistant Examiner* — Ankur Jain
(74) *Attorney, Agent, or Firm* — Antonelli, Terry, Stout & Kraus, LLP.

(57) ABSTRACT

A receiver of a wireless base station that uses a simple mode to detect a failure is provided, and an SW 201 switches whether an input port of the receiver 133 is to be connected with an antenna 114 or to be terminated. An LNA (a low noise amplifier) 205 amplifies an input signal with a low distortion. SWs 202 and 203 switch between a first path which runs through the LNA 205 and a second path 204 which does not run through the LNA 205. An AGC AMP, the gain of which is controlled such that the output thereof is constant, amplifies the signal with the controlled gain. A base station control section uses the SW 201 to terminate the input port of the receiver so that thermal noise is input to the LNA 205. Further, the SWs 202 and 203 are changed over to determine the normality of the receiver based on the fact that a first gain of an AGC-AMP 211 when connected to the first path, a second gain of the AGC-AMP 211 when connected to the second path, and a difference between the first and second gains fall within their respective predetermined ranges.

5 Claims, 6 Drawing Sheets

| SECTION | (1)~(2) | (2)~(3) | (3)~(4) |
|---|---|---|---|
| FUNCTION BLOCK |  |  |  |
| GAIN [dB] | −1.0 | 15.0 | 36.0 |
| NOISE FIGURE [dB] | 1.0 | 2.0 | 14.8 |
| TOTAL GAIN [dB] | −1.0 | 14.0 | 50.0 |
| TOTAL NOISE FIGURE [dB] | 1.0 | 3.0 | 5.0 |

FIG.5

| SECTION | (1)~(2) | (2)~(3) | (3)~(4) |
|---|---|---|---|
| FUNCTION BLOCK |  |  |  |
| GAIN [dB] | −1.0 | −1.0 | 36.0 |
| NOISE FIGURE [dB] | 1.0 | 1.0 | 14.8 |
| TOTAL GAIN [dB] | −1.0 | −2.0 | 34.0 |
| TOTAL NOISE FIGURE [dB] | 1.0 | 2.0 | 16.8 |

BASE STATION, RECEIVING APPARATUS, AND RECEIVER TROUBLE DIAGNOSING METHOD

INCORPORATION BY REFERENCE

The present application claims priority of Japanese Patent Application JP2005-139711 filed on May 12, 2005, the content of which is hereby incorporated by reference into this application.

TECHNICAL FIELD

The present invention relates to a base station, a receiving apparatus, and a receiver failure diagnosing method, and more particularly to a base station, a receiving apparatus, and a receiver failure diagnosing method in a mobile communication system.

BACKGROUND ART

When operating a mobile communications system, stability of the system is one of important elements. A failure leading to system operation halt must be prevented from occurring, a failure must be rapidly detected in case of occurrence of the failure, and recovery must be carried out in order to stably operate the system. Therefore, detection of a failure in a wireless base station and its diagnosing method are very important.

A transmitter and a receiver are mounted in the wireless base station. Detection of a failure in the transmitter of these devices can be relatively easily realized by divaricating a part of transmission main signals generated by the transmitter and monitoring the divaricated signal. On the other hand, detection of a failure in the receiver cannot be realized by just divaricating and monitoring a part of reception signals. That is because a power of the reception signal input to the receiver fluctuates every second in accordance with, e.g., an installation environment, the number of connected terminals, and others, and hence a threshold value that is required to judge whether a reception power value is normal or abnormal cannot be determined. Therefore, detection of a failure in the receiver is generally realized by inputting any known test signal to the receiver and monitoring a reception state of the receiver. A diagnosing method in the receiver is roughly classified into two methods depending on a generation method of this test signal.

One is a method of divaricating a part of output signals from the transmitter mounted in the same wireless base station apparatus and using the divaricated signal as a test signal, and it is called a loopback test (see, e.g., JP-A-2002-246978). The other is a method of mounting a test signal generator that outputs a test signal in the same wireless base station apparatus (see, e.g., JP-A-2001-127715). In both the methods, any known test signal must be input to the receiver to detect a failure in the receiver.

DISCLOSURE OF INVENTION

Problem to be Solved by the Invention

In a mobile communication system, a wide service area is divided into many small areas called cells, and wireless base station apparatuses are arranged in the respective cells. The wireless base station apparatus is connected with a network, and a user terminal performs wireless communication with the wireless base station apparatus in a cell to which this terminal belongs, thereby enabling communication with another terminal through the network.

However, in a place to which no electric wave is transmitted from a regular base station, e.g., an underground mall, providing a mobile communication service is difficult. To solve this problem, introducing a pico-cell base station is considered. The pico-cell base station means an apparatus miniaturized to the limit from a base station main body by reducing a supportable cell size to be smaller than a size of a conventional base station. Since the base station is miniaturized, a degree of freedom in installation is greatly increased, and the base station can be installed even in a place where the base station cannot be installed according to the conventional technology, thus realizing expansion of a service area.

Like the regular wireless base station, when any failure occurs in the pico-cell base station, this failure must be likewise adequately detected.

To realize detection of a failure in the receiver, a known test signal must be input to the receiver. For example, in JP-A-2002-246978 explained above, a part of output signals from the transmitter mounted in the same base station apparatus is divaricated to be input to the receiver, thereby realizing detection of a failure in the receiver. However, according to this method, a frequency of the test signal must match with a reception frequency of the receiver in principle, and there is a problem that this method can be readily applied to a wireless base station adopting a TDD (Time Division Duplex) scheme but it cannot be applied to a wireless base station adopting any other scheme.

Further, for example, a method of divaricating a part of output signals from a local oscillator as a constituent element of the receiver and using the divaricated signal as a test signal is disclosed in JP-A-2001-127715 mentioned above. However, the receiver must have an excellent reception sensitivity and a high reception selectivity. Therefore, multiple filters are mounted in the receiver to attenuate signals having any frequency components other than a receiver's own band. Since a frequency of a local signal is out of a reception band of the receiver, when this signal is used as a test signal, a problem that reception of the test signal becomes difficult arises because a passage loss of the test signal is too large. If the test signal can be received, a minimum value alone of the passage loss in a band other than the reception band is specified, and variations depending on individual base station apparatuses are very considerable. Since a threshold value that is used to judge normality/abnormality is dependent on the passage loss in a frequency of the test signal, there is a problem that the threshold value cannot be appropriately determined when a variation of the passage loss is large.

Furthermore, in an apparatus in which miniaturization of a base station main body has top priority like the pico-cell base station, when an apparatus/circuit that detects a failure is increased in size, a mounting area/power consumption rises, a manufacturing cost price is also increases, and characteristics of the pico-cell base station may be degraded.

In view of the above-explained problem, it is an object of the present invention to provide a base station, a receiving apparatus, and a receiver failure diagnosing method that enable detection of a failure in a receiver of a wireless base station based on a simple mode without inputting a generated test signal to the receiver. Moreover, it is one of objects of the present invention to readily realize detection of a failure in a receiver by a wireless base station that is particularly severely demanded to be miniaturized like a pico-cell base station. Additionally, it is one of objects of the present invention to readily realize detection of a failure in a receiver of a wireless base station without using a special test signal and without interruption of services.

Means for Solving the Problem

In the present invention, a failure in a receiver is detected by using thermal noise present in the receiver rather than a test signal. The thermal noise occurs when free electrons in a conductor make a movement by a thermal energy, and it is noise that is uniformly distributed in all frequencies. Therefore, in any receiver, the thermal noise necessarily occurs in a conductor that is present at an input port of the receiver (or in a circuit). The produced thermal noise is amplified by an amplifier in the receiver and input to a demodulator like other reception signals.

A failure detection circuit is constituted by mounting in the receiver three high-frequency switches and an automatic gain control amplifier making a signal power that is input the demodulator constant. Changing over the three high-frequency switches enables switching a signal path in the receiver, and a gain value of the automatic gain control amplifier in this case is used to diagnose normality of the receiver.

According to first solving means of the present invention, there is provided a base station including:

an antenna;

a receiver which receives a signal from a terminal through the antenna; and a control section which judges normality of the receiver, wherein the receiver has:

a first switch section which switches whether an input port of the receiver is to be connected with the antenna or terminated;

a low-noise amplifier which amplifies a signal input from the input port of the receiver with a low distortion;

a second switch section that switches a signal path of the receiver between a first path which runs through the low-noise amplifier and a second path which does not run through the low-noise amplifier;

an amplifier which amplifies signals from the first path and the second path with a predetermined gain; and an automatic gain control amplifier which controls the gain in such a manner that an output thereof becomes constant, and amplifies an output from the amplifier with the controlled gain, and the control section performs:

terminating the input port of the receiver by using the first switch section to input thermal noise to the low-noise amplifier;

switching the second switch section to acquire a first gain of the automatic gain control amplifier when connected to the first path and a second gain of the automatic gain control amplifier when connected to the second path, respectively; and determining normality of the receiver based on the fact that the acquired first and second gains respectively fall within predetermined first range and second range and a difference between the first gain and the second gain falls within a predetermined third range.

According to second solving means of the present invention, there is provided a receiving apparatus including:

an antenna;

a receiver which receives a signal through the antenna; and a control section which judges normality of the receiver, wherein the receiver comprises:

a switch section which switches whether an input port of the receiver is to be connected with the antenna or terminated; and a low-noise amplifier which amplifies a signal input from the input port of the receiver with a low distortion, the control section terminates the input port of the receiver by using the switch section to input thermal noise at the input port of the receiver to the low-noise amplifier, and the thermal noise is used as a test signal required to judge normality of the receiver.

According to a third solving means of the present invention, there is provided a receiver failure diagnosing method of judging normality of a receiver which receives a signal from a terminal through an antenna, including:

terminating an input port of the receiver to input thermal noise to a low-noise amplifier which amplifies an input signal with a low distortion;

connecting a signal path of the receiver to a first path which runs through the low-noise amplifier and an automatic gain control amplifier which controls a gain in such a manner that an output thereof becomes constant and amplifies a signal with the gain;

acquiring a first gain of the automatic gain control amplifier when connected to the first path;

connecting the signal path of the receiver to a second path which runs through the automatic gain control amplifier without including the low-noise amplifier;

acquiring a second gain of the automatic gain control amplifier when connected to the second path; and determining normality of the receiver based on the fact that the acquired first and second gains respectively fall within predetermined first range and second range and a difference between the first gain and the second gain falls within a predetermined third range.

Advantages of the Invention

According to the present invention, there can be provided the base station, the receiving apparatus, and the receiver failure diagnosing method that can detect a failure in the receiver of the wireless base station based on a simple mode without inputting a generated test signal to the receiver. Further, according to the present invention, detection of a failure in the receiver can be readily realized in the wireless base station that is particularly severely demanded to be miniaturized like a pico-cell station. Furthermore, according to the present invention, detection of a failure in the receiver of the wireless base station can be readily realized without using a special test signal and without interrupting services.

Other objects, characteristics, and advantages of the present invention will become obvious from the following description of an embodiment according to the present invention concerning accompanying drawings.

BEST MODE FOR CARRYING OUT THE INVENTION

An embodiment according to the present invention will now be explained while taking a wireless base station including one transmitter and two receivers and enabling diversity reception as an example with reference to the drawings.

Figure 1:
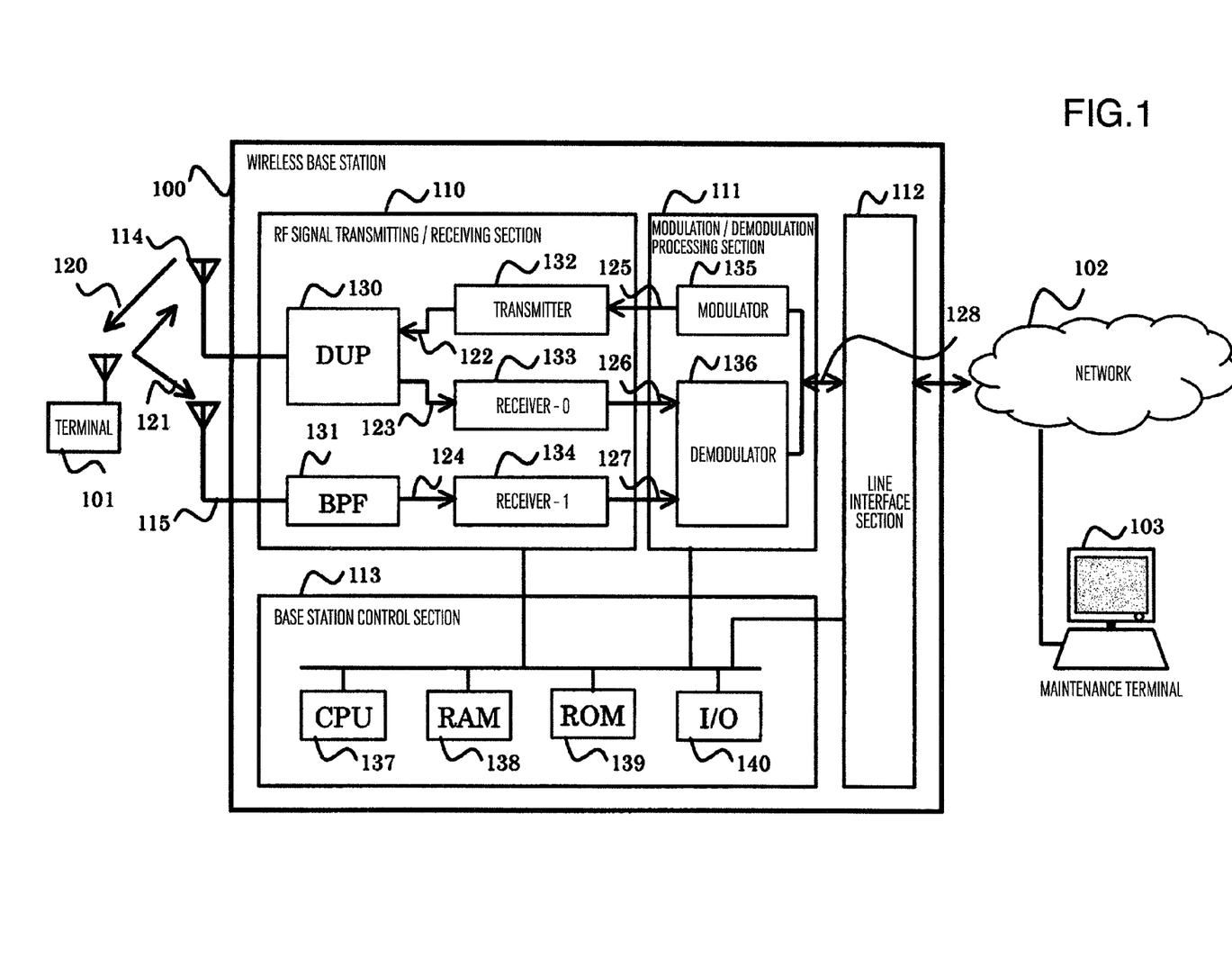
FIG. 1 is a block diagram of a wireless base station apparatus according to an embodiment of the present invention.

FIG. 1 is a block diagram of a wireless base station. A wireless base station 100 includes a RF signal transmitting/receiving section 110 (RF: radio frequency), a modulation/demodulation processing section 111, a line interface section 112, and a base station control section 113. The wireless base station is, e.g., a pico-cell base station. It is to be noted that the pico-cell base station is just an application example, and a failure detection circuit and a diagnosing method according to this embodiment can be also applied to other wireless base station apparatuses including the pico-cell base station. Moreover, they can be also applied to receiving apparatuses other than the wireless base station.

The RF signal transmitting/receiving section 110 has an antenna-0 114 for transmission/reception and an antenna-1 115 for reception connected thereto, and has one transmitter 132 and two receivers (a receiver-0 133, a receiver-1 134). Additionally, the RF signal transmitting/receiving section 110 has a DUP (a duplexer) 130 that separates a forward link RF signal 120 from an reverse link RF signal 121 and a BPF (a band pass filter) 131 that limits a passage band of the reverse link RF signal 121. The transmitter 132 converts a forward link baseband signal 125 input from a modulator 135 into a forward link RF signal 122. The receiver-0 133 receives the reverse link RF signal 121 transmitted from a terminal 101 through the DUP 130 (a signal 123), and converts it into an reverse link baseband signal 126. Additionally, the receiver-1 134 receives the reverse link RF signal 121 transmitted from the terminal 101 through the BPF 131 (a signal 124), and converts it into a reverse link baseband signal 127.

The modulation/demodulation processing section 111 includes the modulator 135 and a demodulator 136 to modulate/demodulate data. The line interface section 112 is an interface of the wireless base station 100 and a network 102. The base station control section 113 has a monitoring/controlling function of the wireless base station 100. For example, the base station control section 113 has a CPU 137, a memory (e.g., an RAM 138 or an ROM 139), and an I/O 140. It is to be noted that the base station control section 113 is connected with the RF signal transmitting/receiving section 110 and can transmit/receive information to/from the receiver in the RF signal transmitting/receiving section 110. A maintenance terminal 103 is connected with the base station control section 113 through the network 102 and has a function of remotely monitoring/controlling the wireless base station 100. It is to be noted that the wireless base station 100 may include the plurality of RF signal transmitting/receiving sections 110 and the plurality of modulation/demodulation processing sections 111 connected with the respective RF signal transmitting/receiving sections 110 corresponding to a plurality of sectors. In this case, the respective RF signal transmitting/receiving sections 110 and modulation/demodulation processing sections 111 are connected with the base station control section 113, and the respective modulation/demodulation processing sections 111 are connected with the line interface section 112.

Figure 2:
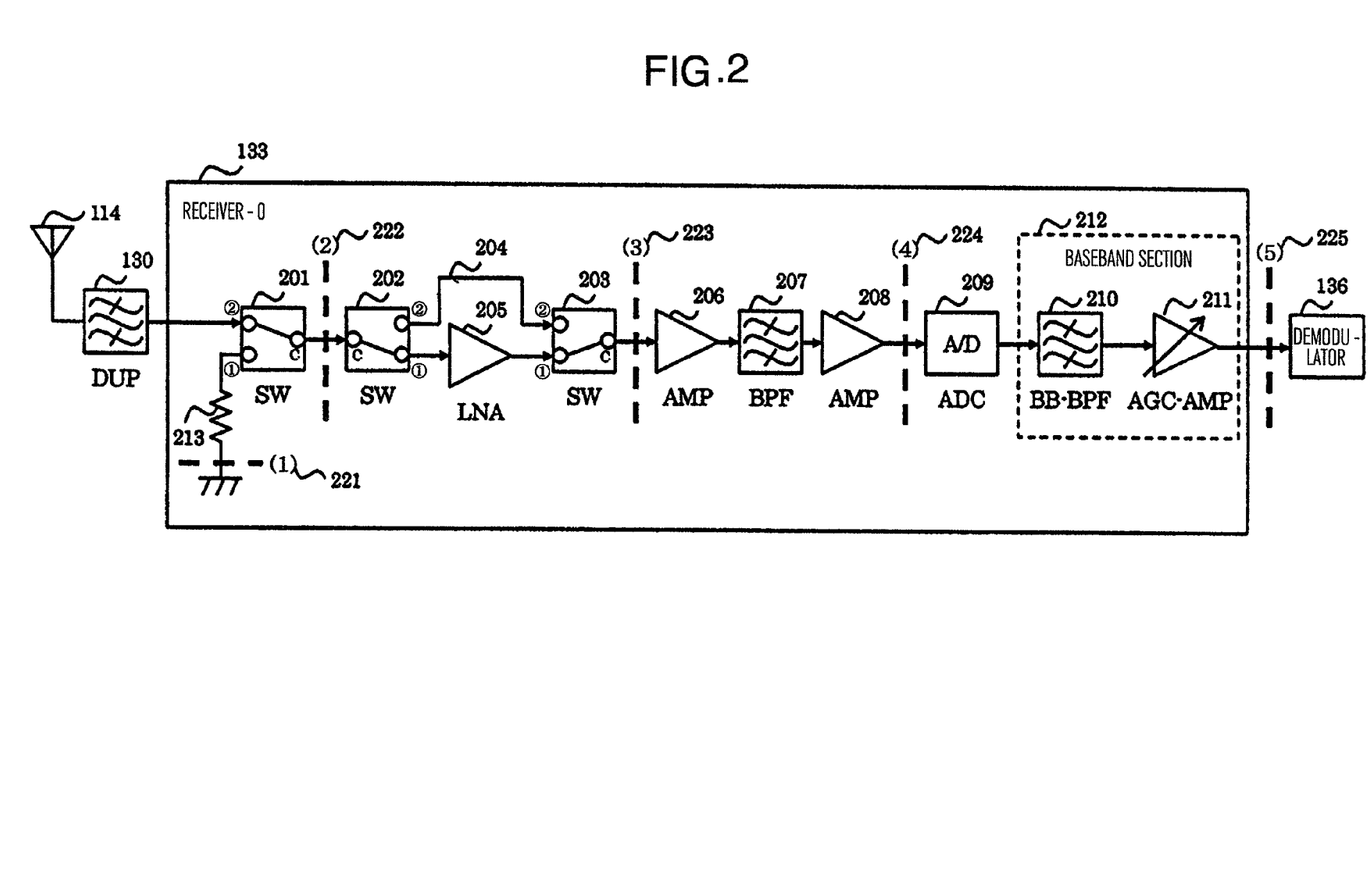
FIG. 2 is a block diagram of a receiver failure detection circuit according to the embodiment of the present invention.

FIG. 2 is a block diagram of a receiver having a built-in failure detection circuit that realizes detection of a failure in the receiver. It is to be noted that FIG. 2 shows a configuration of the receiver-0 133, but the receiver-0 133 and the receiver-1 134 may have the same configuration, thereby omitting an explanation of the receiver-1 134.

The receiver-0 133 has a plurality of switches SW 201 (a first switch section), SW 202, and SW 203 (Sews 202 and 203 are determined as a second switch section), an LNA (a low-noise amplifier) 205, an AMP (an amplifier) 206, an AMP 208, a BPF (a band pass filter) 207, an ADC (an AD converter) 209, a baseband section 212, and a terminating circuit 213. Further, the baseband section 212 has a BB-BPF (a baseband band pass filter) and an AGC-AMP (an automatic gain control amplifier). It is to be noted that the LNA 205 (a first amplifying section), the AMP 206, the BPF 207, and the AMP 208 (a second amplifying section) may be constituted of other elements having the same functions.

The receiver 133 has three high-frequency switches, i.e., the switches SW 201, SW 202, and SW 203. The SW 201 has a function of switching whether an input port of the receiver is to be connected with the antenna 114 or to be terminated. The receiver 133 works as the receiver when the input port is connected with the antenna 114, and works as the failure detection circuit when the input port is connected with the terminating circuit 213. When the input port of the receiver is terminated (connected to the terminating circuit 213 side) by the SW 201, thermal noise present at the input port is input to the LNA 205 where this noise is amplified. The thermal noise is present in a conductor in the circuit so that it can be determined based on a Boltzmann's factor or a temperature. This thermal noise is used as a test signal. It is to be noted that the thermal noise is also present at positions other than the input terminal, and it is present in, e.g., a conductor between the SW 203 and the AMP 206, but its influence on a failure test is small as compared with a level of a signal amplified with a low distortion by the LNA 205.

The SW 202 and the SW 203 operate while cooperating with each other, and have a function of switching a signal path of the receiver to run through the LNA (the low-noise amplifier) 205 or to be a path 204 that bypasses the LNA 205. When the SW 202 and the SW 203 are set to a terminal 1 side (which will be referred to as an SW setting (1) hereinafter), a path running through the LNA 205 (a first path) can be obtained. Furthermore, when the SW 202 and the SW 203 are set to a terminal 2 side (which will be referred to as an SW setting (2) hereinafter), a path (a second path) 204 bypassing the LNA 205 is provided.

The LNA 205 is a low-noise amplifier that amplifies a reception signal with a low distortion. The AMP 206/AMP 208 is am amplifier that amplifies a reception signal with a predetermined gain. The BPF 207 is a band pass filter that attenuates unnecessary signal components other than the receiver's own band. The ADC 209 is an AD converter that converts an input signal from an analog signal into a digital signal. The BB-BPF 210 is a band pass filter function that is realized in digital signal processing. The AGC-AMP 211 is an automatic gain control amplifier, and has a function of changing a gain of the amplifier in accordance with an input power to make a signal power input to the demodulator 136 constant. It is to be noted that the function of the AGC-AMP 211 is realized as the function of the baseband section 212 in FIG. 2, but it may be realized in an analog signal processing part before a signal is subjected to analog-digital conversion. The receiver 133 has a function of setting the SWs 201 to 203 and reporting a gain of the AGC-AMP 211 in accordance with an instruction from the base station control section 113.

For example, a case where a gain of the AGC-AMP 211 is subjected to closed loop control so that an reverse link signal power at an input port (a port (5) 225) of the demodulator becomes 0 dBm will now be considered. Of the components constituting the receiver, the AGC-AMP 211 alone has a variable gain, and the other components (e.g., the LNA 205, or the AMPs 206 and 208) have fixed gains. When a sum total of gain values of all the components other than the AGC-AMP 211 is determined as a receiver fixed gain, the following expression can be achieved.

(Reception Power)+(Receiver Fixed Gain)+(Gain of AGC-AMP)=0 dBm

As a result, the gain of the AGC-AMP 211 is subjected to closed loop control to satisfy the following expression.

(Gain of AGC-AMP)=−(Receiver Fixed Gain)−(Reception Power)

Since the receiver fixed gain (e.g., gains of members, i.e., the input port of the receiver to an input of the AGC-AMP 211) is fixed, an expected value is present in a gain value of the AGC-AMP 211 when a signal having a known power value is input to the receiver's input terminal. That is, checking whether the gain value of the AGC-AMP 211 falls within a previously obtained range of the expected value enables diagnosing normality of the receiver.

Figure 3:
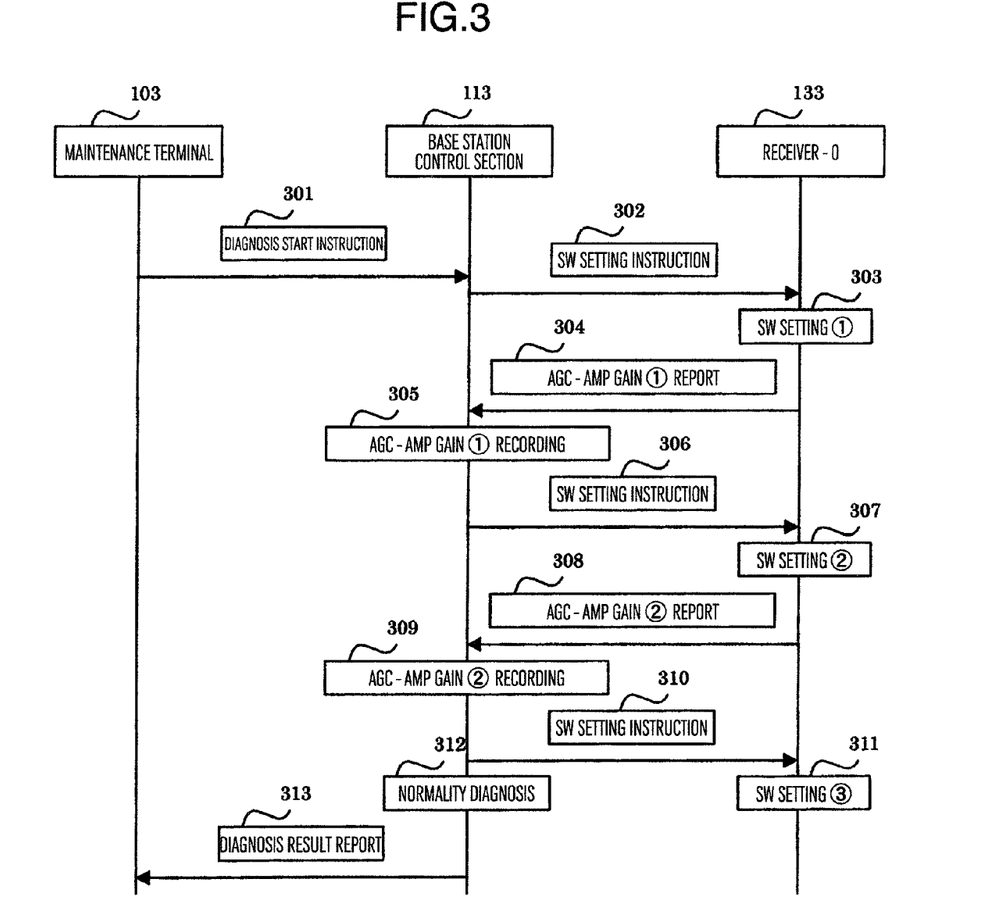
FIG. 3 is a sequence diagram of a receiver normality diagnosing method according to the embodiment of the present invention.

FIG. 3 is a sequence diagram of a receiver failure detecting method.

Detection of a failure in the receiver according to this embodiment will now be explained with reference to FIGS. 1, 2, and 3. It is to be noted that the receiver-0 133 and the receiver-1 134 can perform diagnosis in accordance with the same procedure, thereby omitting an explanation of the diagnosis procedure of the receiver-1 134 in FIG. 3 and the following description. Moreover, a detailed procedure that the base station control section 113 receives a request or an instruction from the maintenance terminal 103 through the network 102 and the line interface section 112 to control, e.g., settings of the RF signal transmitting/receiving section 110 and the base station control section 113 returns a response or a result for the request or the instruction to the maintenance terminal 103 through the line interface section 112 and the network 102 is well known, and hence this procedure will be omitted.

Diagnosis of normality of the receiver begins when a maintenance operator inputs a command of executing receiver normality diagnosis to the maintenance terminal 103. It is to be noted that, in regard to a trigger of starting diagnosis, any other appropriate triggers, e.g., starting diagnosis when a predetermined clock time is reached in accordance with a predetermined diagnosis schedule may be used. The command of executing the receiver normality diagnosis includes, specification of a base station to be tested and specification of a receiver to be diagnosed (e.g., an identifier of a sector and/or a system).

At a step 301, the maintenance terminal 103 notifies the base station control section 113 in the specified wireless base station 100 of an instruction of starting diagnosis including identifying information of the specified receiver. It is to be noted that specification of a receiver to be diagnosed may be omitted and a command of sequentially executing tests of all receivers or predetermined receivers in the wireless base station 100 may be prepared.

At a step 302, the base station control section 113 instructs the receiver-0 133 to set the SW 201 to the SW 203. At a step 303, the receiver-0 133 sets the SW 201 to a terminal 1 and also sets the SW 202 and the SW 203 to the terminal 1 side (the SW setting (1)) in accordance with an SW setting instruction. As a result, the receiver input port is terminated, and hence the thermal noise alone is equivalently input to a port (1) 221 of the receiver-0 133. Moreover, in the SW setting (1), a path running through the LNA 205 is provided. It is to be noted that how each SW is switched is previously determined, and the SW setting instruction from the base station control section 113 can include setting information of the respective SWs 201, 202, and 203. Additionally, the SW setting instruction may include an identifier for the SW setting and the receiver may set each SW in accordance with predetermined setting information associated with this identifier.

When the receiver is connected with the antenna 114, a reverse link RF signal and external noise are input to the receiver, but powers of these signals vary every second in accordance with an installation environment of the base station 100 or the number of the connected thermals, and hence it cannot be deemed that reception power values are fixed. In order to eliminate these influences and accurately perform diagnosis, the receiver input port is terminated during the diagnosis. It is to be noted that the receiver cannot receive the forward link RF signal 121 when the receiver input port is terminated, but performing diagnosis in accordance with each single branch (i.e., in accordance with the system-0 and the system-1) enables effecting the diagnosis of the receiver without interrupting services if the receiver is a diversity receiver like this embodiment.

At a step 304, the receiver-0 133 reports the base station control section 113 of a gain value of the AGC-AMP (a reported value will be referred to as an AGC-AMP gain (1) hereinafter). The receiver 133 can report a gain value of the AGC-AMP after a predetermined time from the SW setting, for example. At a step 305, the base station control section 133 records the AGC-AMP gain (1) reported by the receiver-0 133 in the RAM 138.

At a step 306, the base station control section 113 again instructs the receiver-0 133 to set the SW 201 to SW 203. At a step 307, the receiver-0 133 sets the SW 201 to the terminal 1 and also sets the SW 202 and the SW 203 to a terminal 2 side (the SW setting (2)) in accordance with the SW setting instruction. At a step 308, the receiver-0 133 reports the base station control section 113 of a gain value of the AGC-AMP (a reported value will be referred to as an AGC-AMP gain (2) hereinafter). At a step 309, the base station control section 113 records the AGC-AMP gain (2) reported by the receiver-0 133 in the RAM 138.

At a step 310, the base station control section 113 commands setting the SW 201 to the SW 203 to restore the receiver-0 133 from the setting for failure detection to the regular receiver setting. At a step 311, the receiver-0 133 sets the SW 201 to the terminal 2 and also sets the SW 202 and the SW 203 to the terminal 1 side. As a result, the receiver input port of the receiver-0 133 is connected with the antenna 114, it can receive the reverse link RF signal 121, thereby being restored to a regular operation state.

At a step 312, the base station control section 113 uses the AGC-AMP gain (1) and the AGC-AMP gain (2) recorded in the RAM 138 to diagnose normality of the receiver. The detail of the diagnosis will be explained later.

At a step 313, the base station control section 113 reports the maintenance terminal 103 of a diagnosis result. The diagnosis result may include, e.g., information required to identify the diagnosed receiver (e.g., a sector and/or a system), the gain values (1) and (2) of the AGC-AMP 211 stored in the RAM 138 and/or information indicating whether a receiver failure has occurred. The maintenance terminal 103 receives the diagnosis result, displays the received diagnosis result in a display section and/or stores it in a storage section, and terminates this diagnosis.

Figure 4:
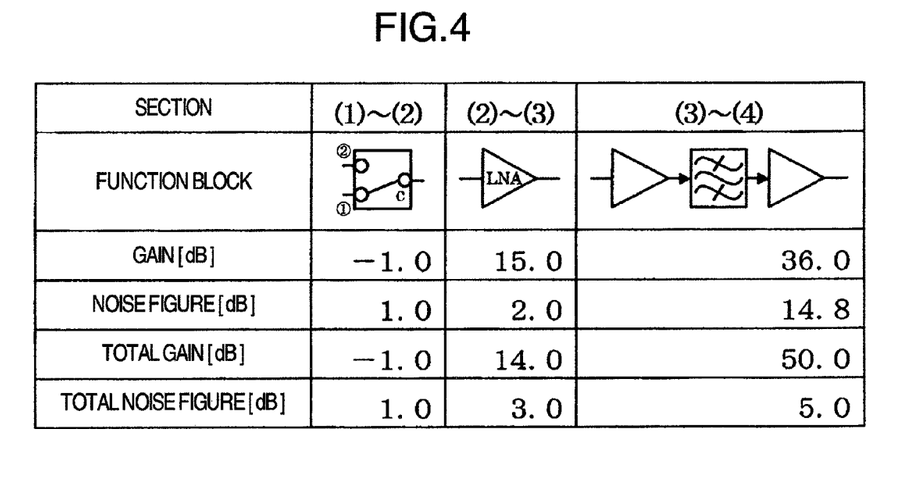
FIG. 4 shows performance of a receiver in case of an SW setting (1) according to the embodiment of the present invention.
Figure 5:
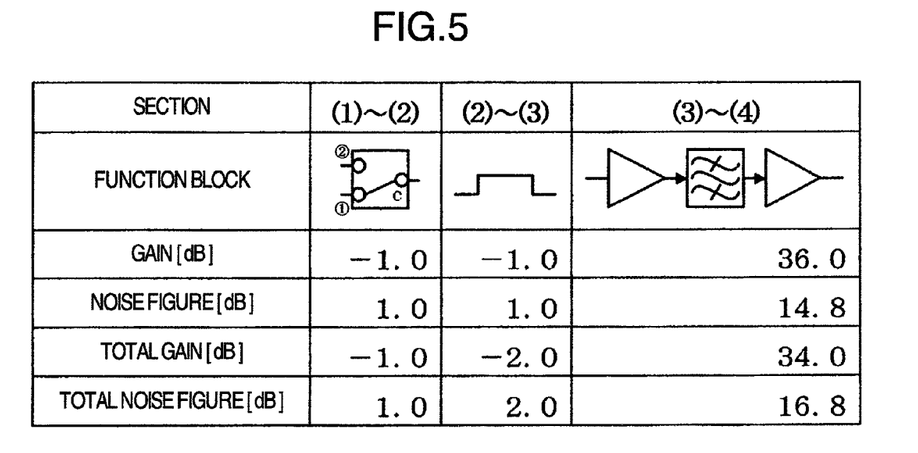
FIG. 5 shows performance of the receiver in case of an SW setting (2) according to the embodiment of the present invention.

FIGS. 4 and 5 are explanatory drawings of performance of the receiver in case of the SW settings (1) and (2).

Here, diagnosis of normality of the receiver when applied to the wireless base station adopting a narrow band CDMA (Code Division Multiple Access) mode will be explained as an example. In regard to a gain and a noise figure in each section of the receiver-0 133, it is assumed that performance shown in FIG. 4 is provided in case of the SW setting (1) and performance shown in FIG. 5 is provided in case of the SW setting (2), for example.

Each of FIGS. 4 and 5 shows a gain, a noise figure, a total gain, and a total noise figure in each section. It is to be noted that the total gain means a gain in the entire section and it is calculated from a gain value of each component. For example, in FIGS. 4 and 5, a numerical value written in a column of a total gain in a section (2)-(3) represents a gain in a section (1)-(3), and a numeral value written in a column of a total gain in a section (3)-(4) represents a gain in a section (1)-(4). Further, the total noise figure is a noise figure in the entire section, and it is calculated from a gain value and a noise figure value of each component. In FIGS. 4 and 5, a numerical value written in a column of a total noise figure in the section (2)-(3) represents a noise figure in the section (1)-(3), and a numerical value written in a column of a total noise figure in the section (3)-(4) represents a noise figure in the section (1)-(4). It is to be noted that the noise figure indicates how much an S/N ratio is degraded with respect to an input having a small level of, e.g., thermal noise, and degradation of the S/N ratio is small when a level to be input is large. For example, since the thermal noise is input to the LNA 205 in the section (2)-(3), the total noise figure is increased by an amount corresponding to the noise figure of the LNA, but an amplified signal is input to the AMP 206 in the section (3)-(4), and hence an increase (2.0 dB) of the total noise figure is smaller than the noise figure (14.8 dB) in the section (3)-(4), for example. On the other hand, in FIG. 5, since the path does not run through the LNA 205, a thermal noise level signal is input to the AMP 206 in the section (3)-(4), and hence the total noise figure is increased by an amount corresponding to the noise figure (14.8 dB) in the section (3)-(4).

It is assumed that the gain of the AGC-AMP 211 is subjected to closed loop control in such a manner that a power at the port (5) 225 becomes 0 dBm. A thermal noise power generated at the port (1) 221 can be calculated based on the following expression.

(Thermal Noise Power at Port (1))=10·log
$(k \cdot T \cdot BW \cdot 10^3)$ [dBm]

where k: a Boltzmann constant=$1.38 \times 10^{-23}$ [J/K], T: an absolute temperature [K], and BW: a reception band width [Hz].

Since the reception band width of the wireless base station adopting the narrow band CDMA scheme is 1.23 MHz, if a temperature is 25° C., a thermal noise power at the port (1) is −113 dBm. Since the SW 201 is set to the terminal 1 side and the receiver input port is terminated, this thermal noise is input to the receiver.

Figure 6:
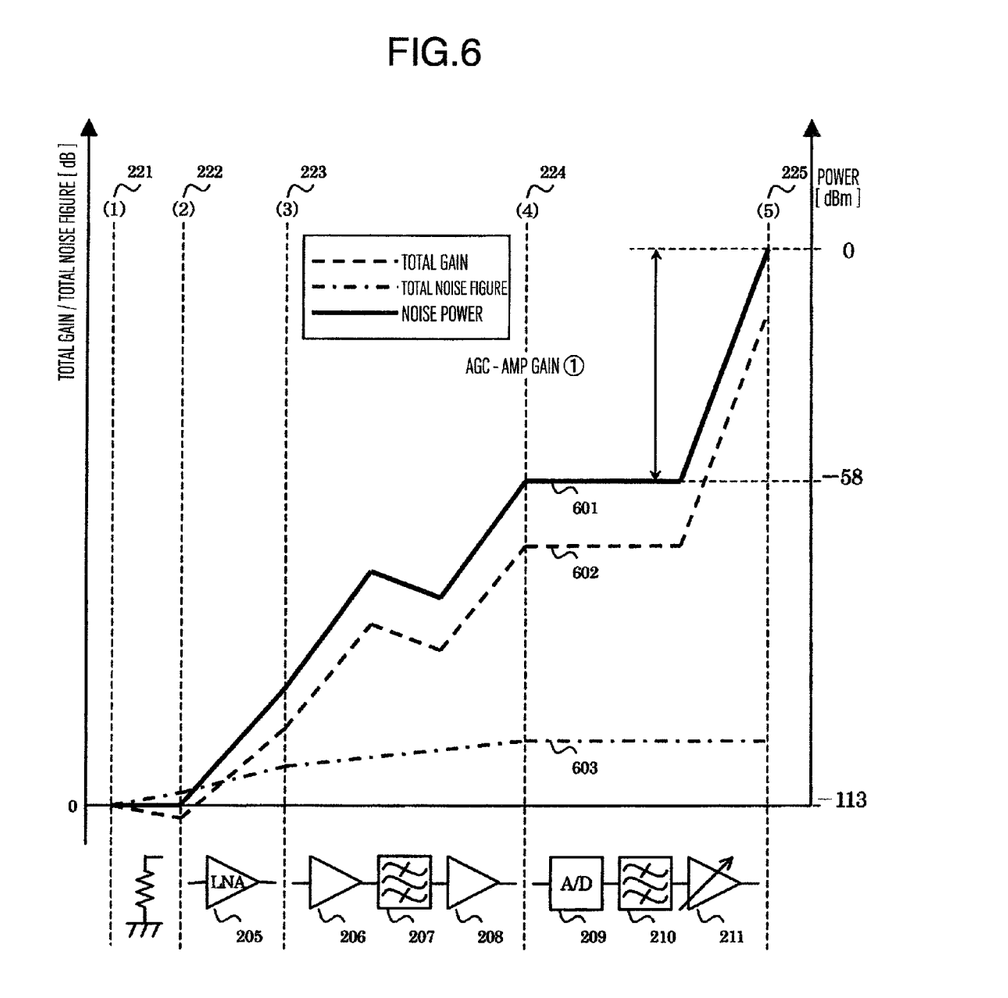
FIG. 6 is a level diagram of the receiver in case of the SW setting (1) according to the embodiment of the present invention.
Figure 7:
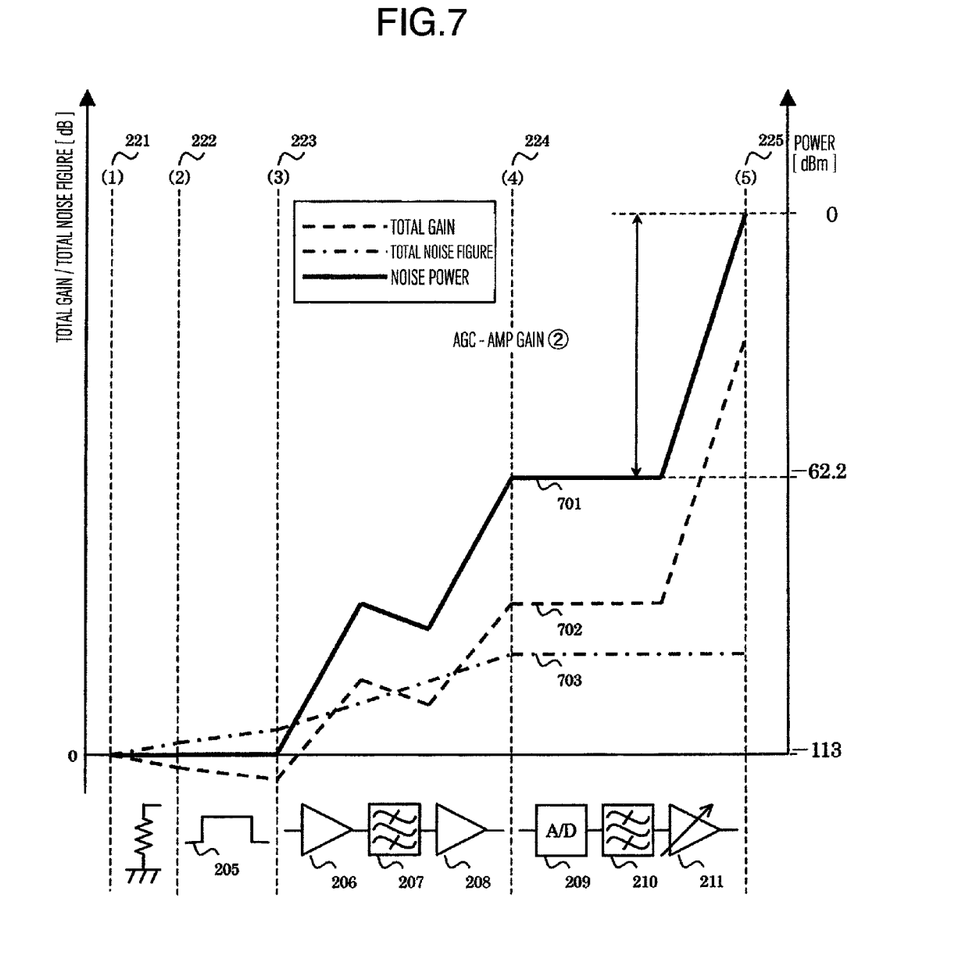
FIG. 7 is a level diagram of the receiver in case of the SW setting (2) according to the embodiment of the present invention.

FIGS. 6 and 7 are level diagrams of the receiver in case of the SW setting (1) and the SW setting (2). The total gain, the total noise figure, and the noise power of the receiver vary on levels depicted in FIGS. 6 and 7, for example.

The thermal noise power generated at the port (1) 221 is, e.g., −113 dBm (a band width of 1.23 MHz, a temperature of 25° C.). Since the SW 201 is set to the terminal 1 side and the receiver input port is terminated, signals other than this thermal noise are not input to the receiver.

In case of the SW setting (1), the thermal noise generated at the port (1) 221 reaches a port (4) based on a level diagram of a noise power 601. It is to be noted that a reception power at the port (4) 224 can be calculated by using the following expression.

(Reception Power at Port (4))=(Thermal Noise Power at Port (1))+(Total Gain of Port (1) to Port (4))+ (Total Noise Figure of Port (1) to Port (4))=−113 dBm+50 dB+5 dB=−58 dBm Therefore, the gain of the AGC-AMP 211 is subjected to closed loop control to become +58 dB. As a result, an expected value of the AGC-AMP gain (1) can be calculated as 58 dB.

However, the value of the AGC-AMP gain (1) has a variation due to the following factors. One is a variation caused when the thermal noise power generated at the port (1) 221 changes±1 dB depending on a temperature (−40° C. to +85° C.). The other is individual variations in constituent parts in the section from the port (1) 221 to the port (4) 224. Although this differs depending on a circuit scale/utilized components and others of the receiver, there is generally a variation of approximately ±1 dB to ±3 dB. A normality judgment threshold value must be determined considering such a variation, the expected value is set to 58 dB, an allowable range is set to ±3 dB, and a value falling within the range of 50 dB±3 dB is determined as a specified value of the AGC-AMP gain (1), for example. It is to be noted that the expected value of the AGC-AMP gain (1) and the value of the variation are just examples, and any other values may be used.

An example in case of the SW setting (2) will now be explained. In case of the SW setting (2), thermal noise generated at the port (1) 221 reaches the port (4) based on a level diagram of a noise power 701 depicted in FIG. 7. Like the SW setting (1), a reception power at the port (4) can be calculated as follows.

(Reception Power at Port (4))=−113 dBm+34 dB+16.8 dB=−62.2 dBm

Therefore, the gain of the AGC-AMP 211 is subjected to closed loop control to become +62.2 dB. Like the example of the AGC-AMP gain (1), the expected value is set to 62.2 dB, an allowable range is set to ±3 dB, and a specified value of the AGC-AMP gain (2) is determined to fall within a range of 62.2 dB±3 dB, for example. It is to be noted that the expected value of the AGC-AMP gain (2) and the value of a variation are just examples, and any other values may be adopted.

Here, it is assumed that the AGC-AMP gain (1) recorded by the base station control section 113 at the step 305 is 60 dB. This falls within the range of specification of the AGC-AMP gain (1). However, when looking at this value alone, it cannot be said that the receiver is normal in some cases. For example, considering a case where the LNA 205 fails to operate properly, a signal is not amplified, and the thermal noise alone is input to a port (3) 223, a noise signal power becomes equal to the level diagram of the noise power 701 in this case. That is, since conditions in this case equal to conditions of the SW setting (2), the gain of the AGC-AMP 211 may be a value falling within the range of 62.2 dB±3 dB. That is, even if the LNA 205 fails to operate properly, the AGC-AMP gain (1) can be 60 dB.

At the step 312, in order to avoid such erroneous diagnosis, the receiver satisfying all of the following conditions is diagnosed as normal, and any other receivers are diagnosed as abnormal.
1. The AGC-AMP gain (1) falls within a range of 58 dB±3 dB (a first range)
2. The AGC-AMP gain (2) falls within a range of 62.2 dB±d dB (a second range)
3. (AGC-AMP gain (2))−(AGC-AMP gain (1)) falls within a range of 4.2 dB±1 dB (a third range).

A specified value of (AGC-AMP gain (2))−(AGC-AMP gain (1)) will now be explained. Since an expected value of (AGC-AMP gain (2))−(AGC-AMP gain (1)) is a value obtained by subtracting an expected value of the AGC-AMP gain (1) from an expected value of the AGC-AMP gain (2), it is 4.2 dB. A variation of this value is smaller than those of the AGC-AMP gain (1) and the AGC-AMP gain (2). That is because the section between the port (1) 221 and the portion (2) 222 and the section between the port (3) 223 and the port (4) 224 are common sections in a circuit that measures the AGC-AMP gain (1) and the AGC-AMP gain (2). Since the section between the port (1) 221 and the port (2) 222 is the common section, an influence of a change in the thermal noise power generated at the port (1) 221 depending on a temperature is eliminated. Further, since the section between the port (3) 223 and the port (4) 224 is also the common section, individual variations in components constituting this section bears no relation. Therefore, a variation in a value of (AGC-AMP gain (2))–(AGC-AMP gain (1)) is dependent on the section between the port (2) 222 and the port (3) 223, i.e., a performance variation of the LNA 205. For example, assuming that an allowable range is ±1 dB, the specified value of (AGC-AMP gain (2))–(AGC-AMP gain (1)) can be set to fall within the range of 4.2 dB±3 dB in accordance with performance concerning an amplification factor and noise, but any other values may be adopted. Specific values of the three conditions are determined from the values depicted in FIGS. 4 and 5 before an operation of the receiver, and stored in the ROM 139 or the RAM 138 in the base station control section 113 or a storage device in the maintenance terminal 103. The CPU in the base station control section 113 applies the AGC-AMP gain (1) and the AGC-AMP gain (2) acquired and recorded in accordance with the procedure depicted in FIG. 3 to the three conditions, thereby judging normality/abnormality of the receiver.

Adding the value of (AGC-AMP gain (2))–(AGC-AMP gain (1)) to the judgment conditions of the normality diagnosis enables detecting a failure in the LNA 205. Failures that occur in components other than the LNA 205 can be also detected. For example, if a failure has occurred in the AMP 206, since a value of the AGC-AMP gain (1) and a value of the AGC-AMP gain (2) are substantially equal to each other, the judgment condition 3 cannot be satisfied. This is also true to other components. Therefore, using the three judgment conditions enables realizing the normality diagnosis of the receiver.

INDUSTRIAL APPLICABILITY

The present invention can be utilized in the wireless base station apparatus in the mobile communication system. Furthermore, it can be utilized in a small pico-cell base station.

Although the above has explained the embodiment, the present invention is not restricted thereto, and it is apparent for persons skilled in the art that the present invention can be changed and modified in many ways within the spirit and claims of the present invention.

The invention claimed is:
1. A base station comprising:
an antenna;
a receiver which receives a signal from a terminal through the antenna; and
a control section which is connected with the receiver to judge normality of the receiver, wherein the receiver has:
a first switch section which switches whether an input port of the receiver is to be connected with the antenna or terminated;
a low-noise amplifier which amplifies a signal input from the input port of the receiver with a low distortion;
a second switch section that switches a signal path of the receiver between a first path which runs through the low-noise amplifier and a second path which does not run through the low-noise amplifier;
an amplifier which amplifies signals from the first path and the second path with a predetermined gain; and
an automatic gain control amplifier which controls the gain in such a manner that an output thereof becomes constant, and amplifies an output from the amplifier with the controlled gain, and
the control section performs:
terminating the input port of the receiver by using the first switch section to input thermal noise to the low-noise amplifier;
switching the second switch section to acquire a first gain of the automatic gain control amplifier when connected to the first path and a second gain of the automatic gain control amplifier when connected to the second path, respectively; and
determining normality of the receiver based on the fact that the acquired first and second gains respectively fall within a predetermined first range and second range and a difference between the acquired first and second gains falls within a predetermined third range;
wherein the first and second range are determined based on an expected value and a predetermined allowable range, the expected value being based on a thermal noise power determined depending on a reception band width and a temperature, and a total gain and a total noise figure in a section between an input port of the receiver and an input port of the automatic gain control amplifier when connected to the first and second path, respectively.

2. The base station according to claim 1, wherein an expected value of the third range is a difference between the expected value of the first range and the expected value of the second range.

3. The base station according to claim 1, wherein the allowable range of the third range is a value previously determined in accordance with performance concerning an amplification factor of the low-noise amplifier and noise.

4. A receiving apparatus comprising:
an antenna;
a receiver which receives a signal through the antenna; and
a control section which is connected with the receiver to judge normality of the receiver, wherein the receiver comprises:
a switch section which switches whether an input port of the receiver is to be connected with the antenna or terminated; and
a low-noise amplifier which amplifies a signal input from the input port of the receiver with a low distortion,
the control section terminates the input port of the receiver by using the switch section to input thermal noise at the input port of the receiver to the low-noise amplifier, and the thermal noise is used as a test signal required to judge normality of the receiver; wherein the receiver further has:

a second switch section that switches a signal path of the receiver between a first path which runs through the low-noise amplifier and a second path which does not run through the low-noise amplifier;

an amplifying section which amplifies signals from the first path and the second path with a predetermined gain; and an automatic gain control amplifier which controls a gain in such a manner that an output thereof becomes constant, and amplifies an output from the amplifier with the controlled gain, and the control section performs:

terminating the input port of the receiver by using the switch section to input thermal noise to the low-noise amplifier;

switching the second switch section to acquire a first gain of the automatic gain control amplifier when connected to the first path and a second gain of the automatic gain control amplifier when connected to the second path, respectively; and determining normality of the receiver based on the fact that the acquired first and second gains respectively fall within a predetermined first range and second range and a difference between the acquired first and second gains falls within a predetermined third range;

wherein the first and second range are determined based on an expected value and a predetermined allowable range, the expected value being based on a thermal noise power determined depending on a reception band width and a temperature, and a total gain and a total noise figure in a section between an input port of the receiver and an input port of the automatic gain control amplifier when connected to the first and second path, respectively.

5. A receiver failure diagnosing method of judging normality of a receiver which receives a signal from a terminal through an antenna, comprising:

terminating an input port of the receiver to input thermal noise to a low-noise amplifier which amplifies an input signal with a low distortion;

connecting a signal path of the receiver to a first path which runs through the low-noise amplifier and an automatic gain control amplifier which controls a gain in such a manner that an output thereof becomes constant and amplifies a signal with the gain;

acquiring a first gain of the automatic gain control amplifier when connected to the first path;

connecting the signal path of the receiver to a second path which runs through the automatic gain control amplifier without including the low-noise amplifier;

acquiring a second gain of the automatic gain control amplifier when connected to the second path; and determining normality of the receiver based on the fact that the acquired first and second gains respectively fall within a predetermined first range and second range and a difference between the acquired first and second gains falls within a predetermined third range;

wherein the first and second range are determined based on an expected value and a predetermined allowable range, the expected value being based on a thermal noise power determined depending on a reception band width and a temperature, and a total gain and a total noise figure in a section between an input port of the receiver and an input port of the automatic gain control amplifier when connected to the first and second path, respectively.

* * * * *